(12) United States Patent
Jaquette et al.

(10) Patent No.: US 7,038,874 B1
(45) Date of Patent: *May 2, 2006

(54) TAMPER RESISTANT WRITE ONCE RECORDING OF A DATA STORAGE CARTRIDGE HAVING REWRITABLE MEDIA

(75) Inventors: Glen Alan Jaquette, Tucson, AZ (US); Paul Bartlett, Bristol (GB); Gregory Alyn Unruh, San Clemente, CA (US)

(73) Assignees: International Business Machines Corporation, Armonk, NY (US); Hewlett-Packard Company, Boise, ID (US); Certance, LLC, Scotts Valley, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 10/440,694

(22) Filed: May 19, 2003

(51) Int. Cl.
*G11B 15/18* (2006.01)

(52) U.S. Cl. .......................................... 360/69

(58) Field of Classification Search ................ 360/69, 360/132; 235/385, 375
See application file for complete search history.

(56) References Cited

U.S. PATENT DOCUMENTS

| | | | |
|---|---|---|---|
| 5,901,916 A | 5/1999 | McAllister et al. ......... 242/348 |
| 5,971,281 A * | 10/1999 | Frary et al. .................. 235/487 |
| 6,195,007 B1* | 2/2001 | Takayama et al. ........ 340/572.1 |
| 6,452,745 B1 | 9/2002 | Shiga et al. ................. 360/132 |
| 6,462,906 B1 | 10/2002 | Morita et al. ............... 360/132 |
| 6,499,685 B1 | 12/2002 | Morita et al. ............. 342/347.1 |
| 6,563,671 B1 | 5/2003 | Morita et al. ............... 360/132 |
| 6,577,471 B1 | 6/2003 | Morita et al. ............... 360/132 |
| 6,611,394 B1* | 8/2003 | Kato et al. ..................... 360/69 |
| 6,643,086 B1* | 11/2003 | Hiramoto et al. ............. 360/69 |
| 6,648,259 B1 | 11/2003 | Shiga et al. ............. 242/348.2 |
| 6,680,818 B1 | 1/2004 | Morita et al. ............... 360/132 |
| 6,717,771 B1 | 4/2004 | Morita et al. ............... 360/132 |
| 2004/0233566 A1* | 11/2004 | Jaquette ....................... 360/69 |

* cited by examiner

*Primary Examiner*—K. Wong

(74) *Attorney, Agent, or Firm*—BainwoodHuang; David E. Huang, Esq

(57) ABSTRACT

A cartridge handling system and method initialize a data storage cartridge having rewritable media and a cartridge memory for tamper resistant write once recording. A write-once flag is written to a lockable section of the cartridge memory also having a cartridge memory serial number, and the section locked to read-only. A write-once flag and the serial number are written to a required data set of the rewritable media, both thereby appearing in both locations of the cartridge.

27 Claims, 7 Drawing Sheets

TAMPER RESISTANT WRITE ONCE RECORDING OF A DATA STORAGE CARTRIDGE HAVING REWRITABLE MEDIA

CROSS REFERENCE TO RELATED APPLICATION

Copending U.S. patent application Ser. No. 10/440,886 (TUC920010132US1) filed on even date herewith relates to, inter alia, placement of write-once flags in initializing a data storage cartridge having rewritable media to write once.

FIELD OF THE INVENTION

This invention relates to write once recording of media that is rewritable instead of write once, and, more particularly, to protecting against overwrite which is either inadvertent or intentional.

BACKGROUND OF THE INVENTION

Write once recording is a means of securing information at a particular point in time, which information may be archived for future reference. Some recording media is inherently write once, such as "WORM" (write once, read many) optical disk media. As an example, WORM optical disk media may comprise an ablative material, which is ablated when written, and is therefore not subject to being erased and overwritten by new information. It is, however, subject to being destroyed if an attempt is made to overwrite previously written information. Other examples of write once optical disk recording media comprise non-reversible phase change and dye polymer WORM optical disk media. Thus, checks, such as microcode interlocks in a write-once optical disk drive, are employed to insure that a portion of a WORM optical disk that has been written is not overwritten and destroyed. Although the information may be destroyed, such as by ablating or distorting the media, the optical disk cannot be tampered with to alter the information by one with normal user resources.

Some media, such as magnetic tape, is inherently rewritable, meaning that prior information can be erased and overwritten by new information. Various "write protect" devices are often employed to theoretically protect written data on the inherently rewritable media from being erased or overwritten. One example comprises the write protect tab on video tape cartridges which may be broken off to expose an opening that is sensed by the tape drive which prevents erasure or overwriting the tape. Another example is the write protect thumb wheel or slide on magnetic tape cartridges, such as the IBM 3590 magnetic tape cartridge, which may be rotated or repositioned to a write protect position at which a tape data storage drive in which the cartridge is loaded will not erase or overwrite the tape media. An example of a write protect sliding notch is illustrated in U.S. Pat. No. 6,134,066. The patent allows a cartridge memory to be updated even though the cartridge media is write protected. Still another approach is to provide a write prevention flag in a tape information area of the tape, such as illustrated in U.S. Pat. No. 5,493,455.

However, should someone wish to tamper with the cartridge and media to alter the data, a covering may be placed over the write protect opening, or the write protect thumb wheel or slide may simply be rotated or repositioned away from the write protect position. Further, a data storage drive may be operated to reset a write prevention flag off. Thus, someone with normal user resources and an intention of erasing or altering data may easily do so, and then may again set the write protect back to the protected position or state, leaving an impression that the original data remains intact.

Another possibility is to provide write once cartridges that have special mechanical aspects which interface with specially designed data storage drives. Although it is more difficult to alter such a cartridge to read/write, such cartridges must be separately maintained for identification and used only in the instance that the data to be stored is desired to be stored at a write once cartridge. As the result, the write once cartridges are less easily employed by a user in a mixed cartridge environment.

SUMMARY

It is an object of the present invention to provide an indication that a cartridge having rewritable media is designated a write once cartridge, which is beyond the tamper capability of anyone with normal user resources.

It is a further object of the present invention to provide a selectable indication that a cartridge having rewritable media is designated a write once cartridge, which is easily implementable by cartridge and data storage drive manufacturers, and is easily employed by a user.

In accordance with the present invention, a cartridge handling system and method are provided which initialize a data storage cartridge having rewritable media for tamper resistant write once recording. Also, the present invention provides a data storage drive which accommodates an initialized cartridge, rejecting cartridges that may have been tampered with. The data storage cartridges have a rewritable media; a cartridge memory, the cartridge memory having a section lockable to read-only, with a cartridge memory serial number written in the lockable section; and a cartridge shell, the cartridge memory retained in the cartridge shell.

In one embodiment, the cartridge handling system comprises a memory interface for reading and writing information to the cartridge memory of the data storage cartridge; a read/write system for reading and writing information to the rewritable media; and a control system for communicating with the memory interface and the read/write system. The control system causes the memory interface to write a write-once flag to the lockable section of the cartridge memory; causes the memory interface to lock the lockable section of the cartridge memory to read-only; and causes the read/write system to write at least a write-once flag to a required data set of the rewritable media. Thus, write-once flags are provided both at the locked read-only section of the cartridge memory retained in the cartridge shell, and at the required data set of the data storage cartridge rewritable media.

In another embodiment, the required data set comprises a Format Identification Data Set (FID), which is required as part of the initialization of the cartridge, and is required for use of the cartridge.

The cartridge handling system control system causes the memory interface to read at least the cartridge memory serial number from the cartridge memory; and causes the read/write system to write at least a write-once flag and the cartridge memory serial number to a required data set of the rewritable media. Thus, write-once flags and the cartridge memory serial number are provided both at the locked read-only section of the cartridge memory, and at the required data set of the rewritable media.

In a further embodiment, the rewritable media additionally has a prerecorded media identifier, which, for example, may comprise information encoded into a prerecorded servo track or tracks. The control system causes the read/write system to read the prerecorded media identifier from the rewritable media; and causes the memory interface to write a write-once flag and the media identifier to the cartridge memory in the lockable read-only section. Then, the control system causes the memory interface to lock the lockable section of the cartridge memory to read-only, and causes the read/write system to write a write-once flag to the required data set of the rewritable media. Thus, write-once flags and the media identifier are provided both at the locked read-only section of the cartridge memory, and at the data storage cartridge rewritable media. For example, the write-once flags are at the required data set and the media identifier is at the prerecorded servo track.

For a fuller understanding of the present invention, reference should be made to the following detailed description taken in conjunction with the accompanying drawings.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
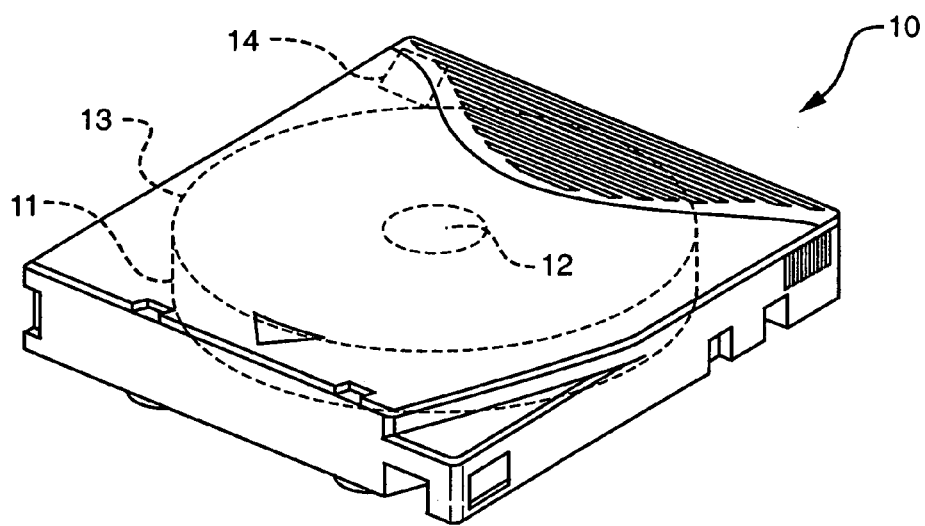
FIG. 1 is an isometric view of a data storage cartridge with a media and a cartridge memory shown in phantom.

Referring to FIG. 1, a data storage cartridge 10 is illustrated which comprises a rewritable data storage media 11, such as a magnetic tape wound on a hub 12 of a reel 13, and a memory circuit 14 (referred to hereinafter as cartridge memory). One example of a magnetic tape cartridge comprises a cartridge based on LTO (Linear Tape Open) technology. The cartridge memory 14, for example, comprises a transponder having a contactless interface, which is retained in the cartridge 10, for example, by being encapsulated by the cartridge when it is assembled, as is understood by those of skill in the art.

Figure 2:
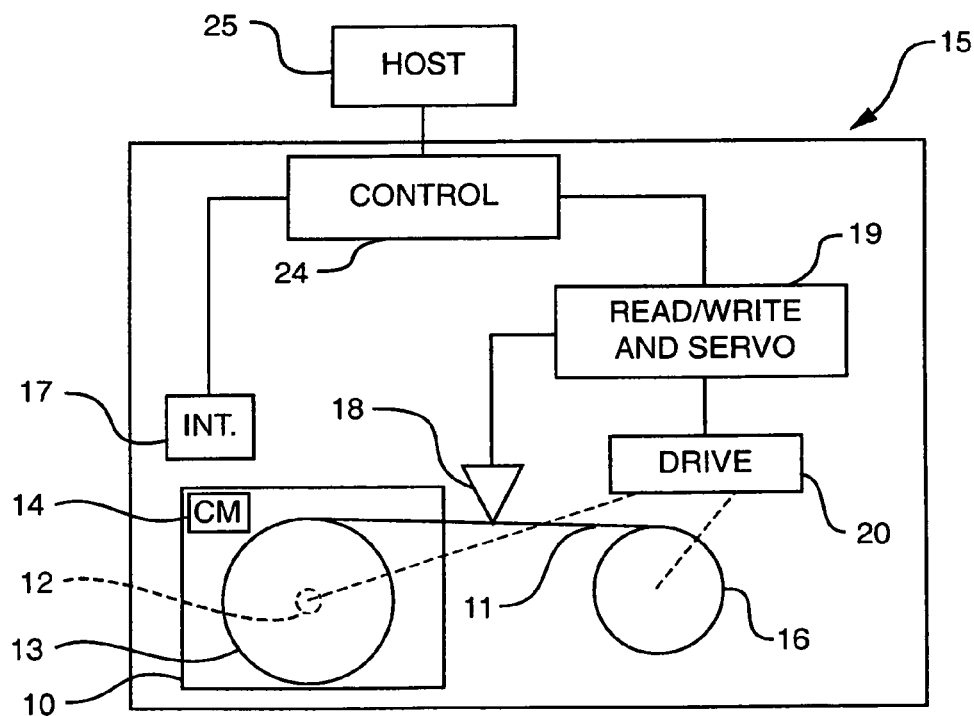
FIG. 2 is a block diagrammatic representation of a cartridge handling system, such as a data storage drive for handling the data storage cartridge of FIG. 1.

Referring to FIG. 2, a cartridge handling system 15, such as a magnetic tape data storage system, is illustrated. One example of a magnetic tape data storage system in which the present invention may be employed is the IBM 3580 Ultrium magnetic tape subsystem based on LTO technology, with microcode to perform initialization of the data storage cartridge 10.

Data storage cartridges may comprise magnetic tape, optical tape, or optical or magnetic disk. Magnetic tape cartridges may comprise dual reel cartridges in which the tape is fed between reels of the cartridge, and may comprise single reel cartridges, such as the instant example, in which the media 11 is wound on a reel 13 in the cartridge 10, and, when loaded in the cartridge handling system 15, is fed between the cartridge reel and a take up reel 16 in the cartridge handling system 15.

The cartridge handling system comprises a memory circuit interface 17 for reading information from, and writing information to, the cartridge memory 14 of the data storage cartridge 10 in a contactless manner. A read/write system is provided for reading and writing information to the rewritable media, and comprises a read/write and servo head 18 with a servo system for moving the head laterally of the magnetic tape media 11, a read/write and servo control 19, and a drive motor system 20 which moves the magnetic tape media between the reels 13 and 16 and across the read/write and servo head 18. The read/write and servo control 19 controls the operation of the drive motor system 19 to move the magnetic tape media 11 across the read/write and servo head 18 at a desired velocity, and stops, starts and reverses the direction of movement of the magnetic tape.

A control system or simply controller 24 communicates with the memory interface 17, and communicates with the read/write system, e.g., at read/write and servo control 19.

The illustrated and alternative embodiments of cartridge handling systems are known to those of skill in the art, including those which employ two reel cartridges.

The control system 24 typically communicates with one or more host systems 25, and operates the cartridge handling system 15 in accordance with commands originating at a host. As illustrated, the cartridge handling system performs the functions of initializing a cartridge 10 as a WORM cartridge in accordance with an embodiment of the present invention, and the functions of a data storage drive and to test a cartridge 10 for valid WORM initialization.

Figure 3:
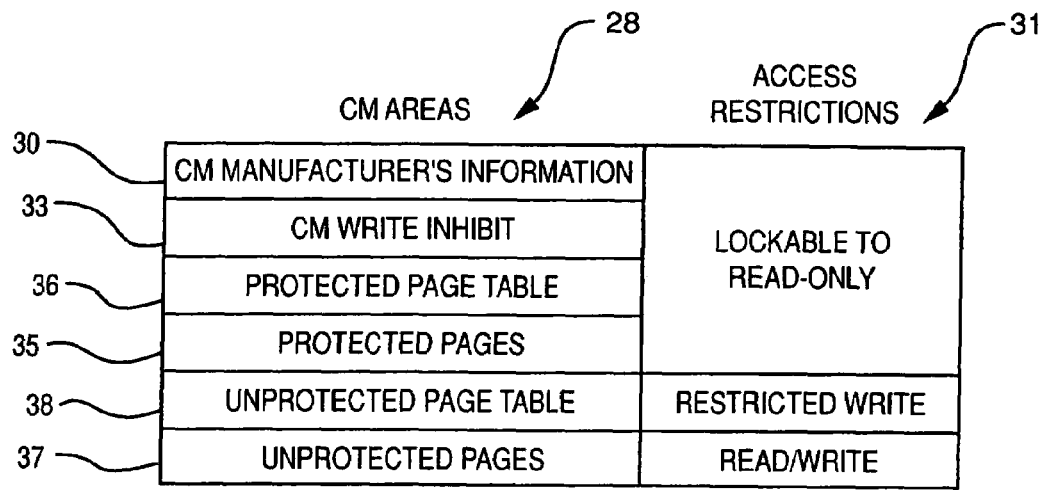
FIG. 3 is a diagrammatic representation of the contents of a cartridge memory of FIG. 1, together with the access restrictions for the cartridge memory contents in accordance with the present invention.

Referring to FIG. 3, an example of the content 28 of a cartridge memory is illustrated. One example of a cartridge memory 14 of FIG. 2 and its content is described in Standard ECMA-319, June 2001, "Data Interchange on 12,7 mm 384-Track Magnetic Tape Cartridges—Ultrium-1 Format", Annex D—LTO Cartridge Memory, pp. 95–115. The cartridge memory 14 of FIG. 2 may be similar to the memory and transponder used in "smart cards" as are known to those of skill in the art.

In the embodiment of FIG. 3, the cartridge memory is arranged in areas of various sizes with information organized into "pages". The definitions herein differ slightly from that of the above ECMA document, in that the cartridge memory herein is divided into "areas", whereas they are called "sections" in the ECMA document. The term "section" as defined herein refers to the portion of the cartridge memory which is lockable to read-only. Any terminology suitable to those of skill in the art may be substituted for "area", for "page", and for "section" as employed herein.

The specific layout of the areas and content of each area may be altered as is known to those of skill in the art.

Certain areas of the cartridge memory, such as area 36, are originally writable and may be read, but are within the section that is lockable to read-only.

Area 30 comprises information provided for or by the manufacturer of the cartridge memory. Access restrictions to the areas 28 are indicated in column 31 in FIG. 3. Thus, in the illustrated embodiment, area 30 is shown as within the section lockable to read-only. Depending on implementation of the cartridge memory, area 30 may be lockable by the cartridge memory manufacturer separately from the rest of the "lockable to read-only" section, but this is unimportant to the present invention as the intention is to not alter this area in any case.

Area 33 is the location for a write inhibit code, which, when implemented, locks the lockable section of the cartridge memory and converts the "lockable to read-only" areas to read-only. As one example, a write inhibit code may comprise a set of characters, or, as another example, a write inhibit code may comprise a single bit in a given location. When the lockable section is locked, the write inhibit code of area 33 itself cannot be written over and is read-only, as shown by column 31. Thus, the write inhibit code may not be retracted, and once a cartridge memory is initialized and locked, it cannot be reinitialized. Alternatively, a locking pointer may be employed which degates write access to the section of the memory before the address which the pointer specifies, similar to the way "smart cards" work. Thus, the pointer itself is locked and cannot be changed, and the pointer additionally specifies an address range below which nothing else may be updated. For example, this pointer may be in area 33, but the pointer may specify that area 38 and some pages nominally defined as "unprotected" pages are to be locked, preventing them from being updated.

Area 35 comprises pages that are protectable, in that they are also lockable to read-only as indicated by column 31, and area 36 comprises a table describing the content of area 35, and is also protectable. Area 37 comprises pages that may be written as well as read and are not typically protected to read-only, as pointed out by column 31, and area 38 comprises a table describing the content of area 37. As discussed in the above ECMA document, area 37 comprises information that is continually updated during usage of the cartridge. Area 38 does not need to be updated after cartridge initialization unless a cartridge memory page is relocated, or changed in size; and neither may be allowed by a given implementation; and, if so, area 38 does not need to change, and thus could be locked, shown as "restricted write" in FIG. 3.

Thus, areas 30–36 are lockable to read-only, and comprise a "lockable read-only section" of the cartridge memory. As an example, the write inhibit code may comprise a definition of the areas that are lockable to read-only.

Still referring to FIG. 3, in accordance with the present invention, the manufacturer's information of area 30 includes a cartridge memory serial number which identifies the specific cartridge memory 14 of FIG. 1. Thus, the cartridge memory serial number is typically written in the lockable section of the cartridge memory by the manufacturer of the cartridge memory, at which time it may be locked by a mechanism independent of the area 33 write inhibit. The cartridge memory 14, with the cartridge memory serial number, is retained in the cartridge. As the result, the cartridge memory serial number is an identification of the cartridge and is employed in accordance with the present invention as a means of providing tamper resistant write once recording.

In accordance with the present invention, the control system 24 of FIG. 2 causes the memory interface 17 to write a flag to the lockable section of the cartridge memory 14 indicating that the tape in the cartridge is to be used for write once (WORM) recording only, this flag defined as the write-once flag. As an example, the write-once flag may be written to a protected page of area 35, which, when section 30–36 is locked to read-only, becomes fixed.

Next, the control system 24 of FIG. 2 causes the memory interface 17 to lock the lockable section of the cartridge memory to read-only.

Optionally, the write flag pointer of area 33 is changed to guard the unprotected page table of area 38 and some pages nominally defined as "unprotected pages", preventing them from being updated. As an example, an initialization data page may be locked, which still allows the cartridge to be usable, but prevents the landmarks recorded in the initialization data page from being moved.

Figure 4A:
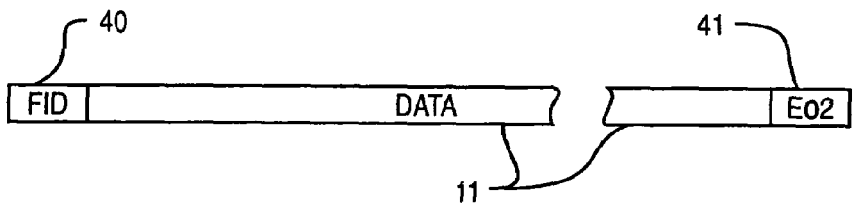
FIGS. 4A and 4B are, respectively, a diagrammatic representation of a media of a data storage cartridge of FIG. 1 with a Format Identification Data Set (FID), and of a FID.
Figure 4B:
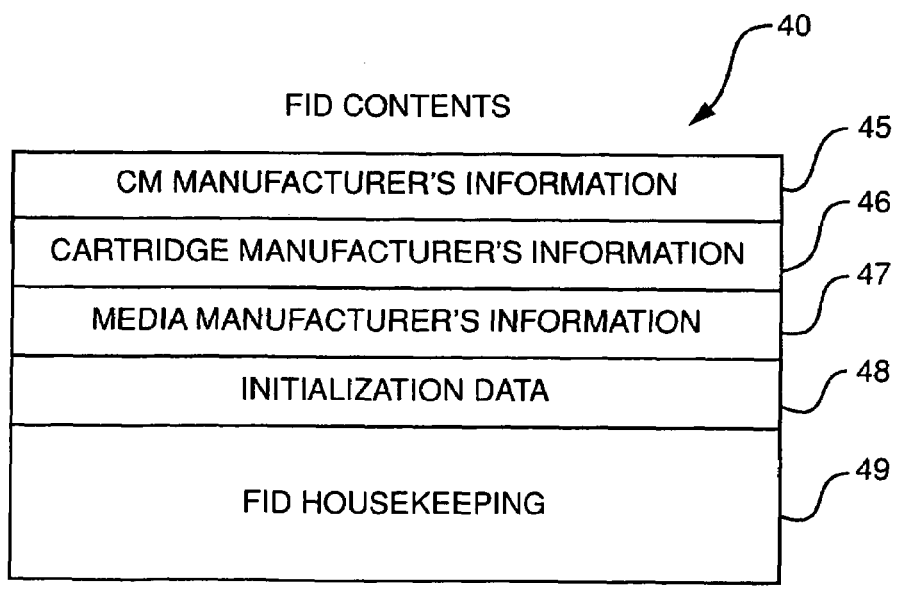

Referring additionally to FIGS. 4A and 4B, the control system 24 of FIG. 2 causes the read/write system 18–20 to write at least a write-once flag to a required data set of the rewritable media. In one embodiment, the required data set is required as a part of the initialization of the cartridge, and is required for use of the cartridge. For example, in accordance with the above ECMA document, clause 13.4, pp. 64–65, clause 15, pp. 81–83, and Annex D.2.4, pp. 98–99, a required data set is called a "Format Identification Data Set", or FID. Those of skill in the art will recognize that alternative required data sets may be employed with alternative types of data storage cartridges.

In FIG. 4A, the FID 40 is located at the logical beginning of a magnetic tape 11. As discussed in the above ECMA document, the logical beginning of the magnetic tape 11 may be other than at the physical beginning. An end of data area 41 may be provided at the the logical end of the tape. This may either be demarked by an end of data Data Set, or may simply be a location on tape.

In FIG. 4B, a FID 40 comprises manufacturer's information by the cartridge memory manufacturer 45, by the cartridge manufacturer 46, and by the media manufacturer 47. Section 48 comprises initialization data, which may comprise the write-once flag. Another section 49 comprises housekeeping data, for example, relating to the other data sets of the tape media 11.

Thus, in accordance with the present invention, write-once flags are provided both at the locked read-only section of the cartridge memory retained in the cartridge shell, and at the required data set of the data storage cartridge rewritable media, thereby providing tamper resistant write once recording.

Further, in accordance with the present invention, in an alternative embodiment, the cartridge handling system control system 24 causes the memory interface 17 to read at least the cartridge memory serial number from the cartridge memory lockable section 30–36; and causes the read/write system 18–20 to write at least a write-once flag and the cartridge memory serial number to the required data set of the rewritable media. In one embodiment, the write-once flag is read from the cartridge memory, and, in another embodiment, the control system 24 provides the write-once flag. As the result, the write-once flags and the cartridge memory serial number are provided both at the locked read-only section of the cartridge memory, and at the required data set of the rewritable media, providing tamper resistant write once recording. Specifically, any attempt to rewrite the data would be prevented since the write-once flags are at both locations, and any attempt to change a cartridge memory, or to move the magnetic tape to another cartridge would be identified since the cartridge memory serial number would not be the same at both the cartridge memory and the media. Further, any attempt to reinitialize the cartridge, e.g., to change the FID, would be prevented by a drive which is checking for these WORM interlocks, as drives which the cartridge can be inserted in would do.

Figure 5:
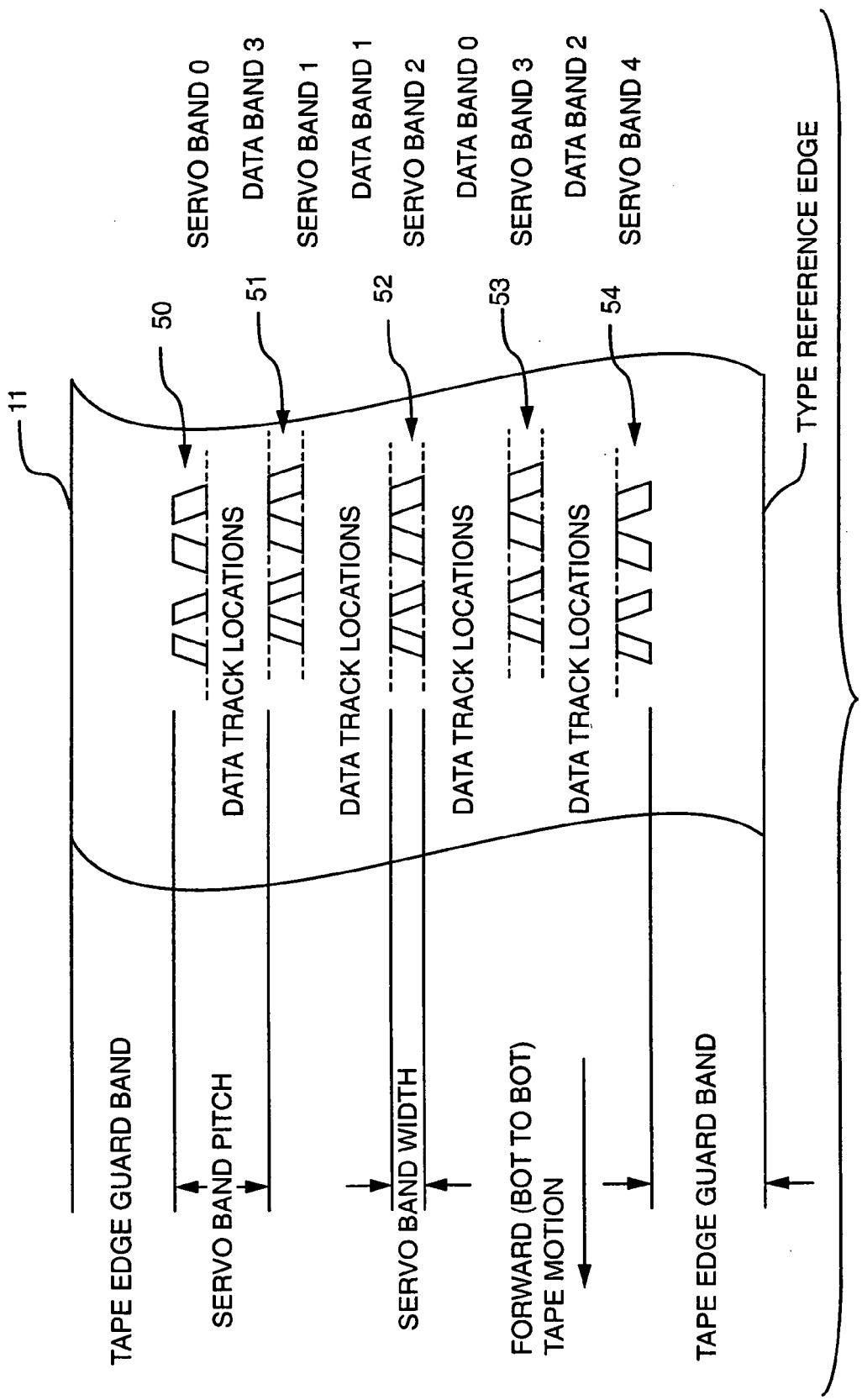
FIG. 5 is a diagrammatic representation of servo tracks of the media of a data storage cartridge of FIG. 1.
Figure 6A:
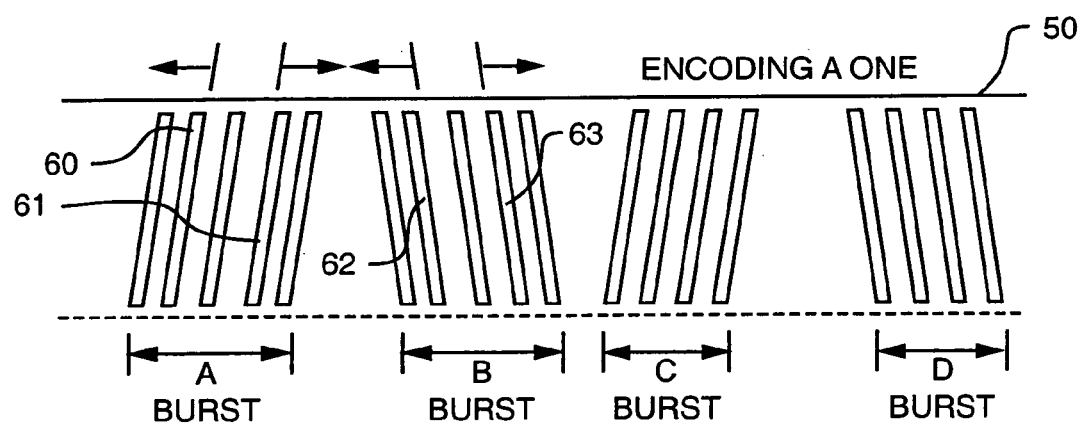
FIGS. 6A and 6B are diagrammatic representations of encoded servo tracks of FIG. 5.
Figure 6B:
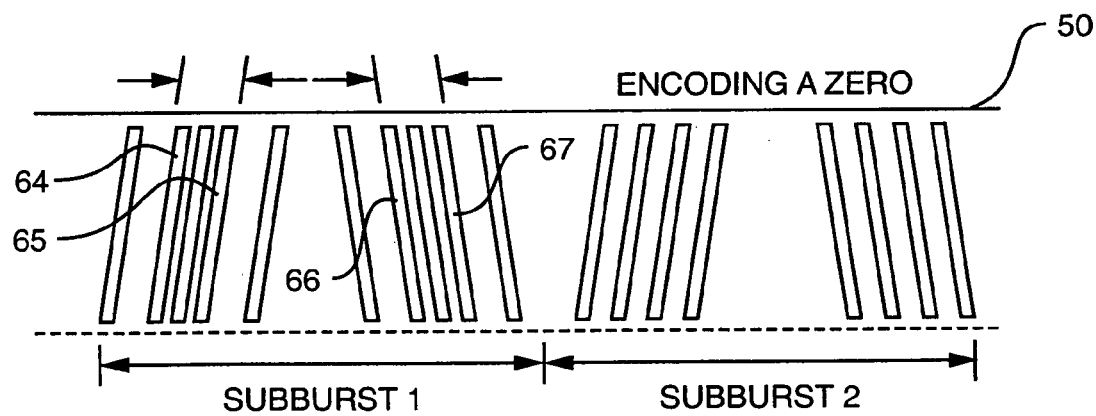
Figure 7:
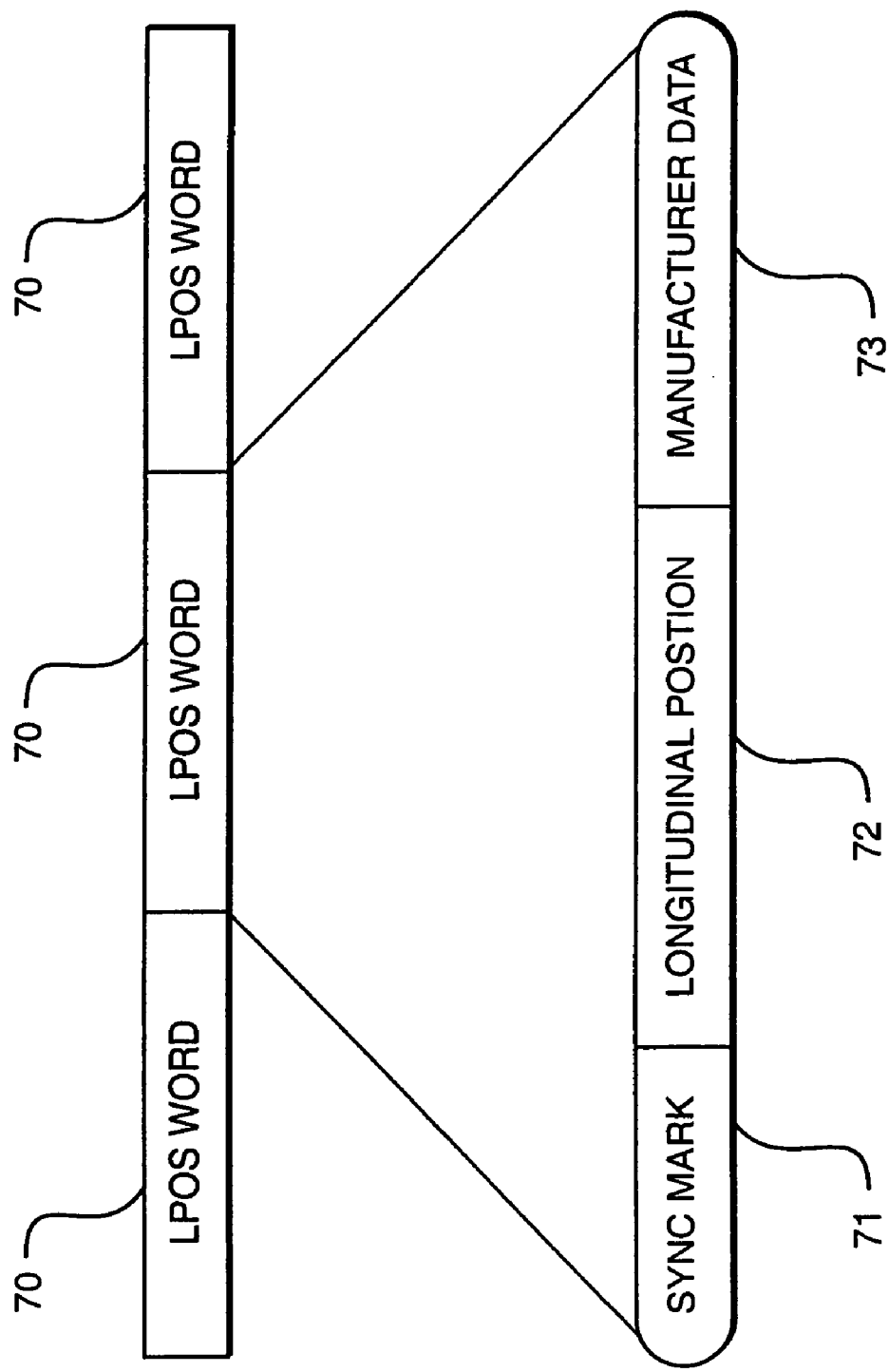
FIG. 7 is a diagrammatic representation of information encoded on servo tracks of a media of a data storage cartridge of FIG. 1.

Referring to FIGS. 5–7, additionally in accordance with the present invention, another reference is maintained to further resist tampering. As is known to those of skill in the art, storage media is typically provided with prerecorded servo tracks which are parallel to the data tracks, so that the read/write head follows the servo tracks to allow the data tracks to be closely spaced. In magnetic tape, for example as illustrated in FIG. 5, a plurality of parallel servo tracks 50–54 are provided on the media 11.

Referring to FIGS. 6A and 6B, as shown in coassigned U.S. Pat. No. 5,930,065, and by the above ECMA document, at clause 11.3, pp. 51–56, information may be encoded into the servo tracks. For example, in FIG. 6A, a binary "1" is encoded by respectively shifting transitions 60 and 61, and transitions 62 and 63, of servo track 50, apart. In FIG. 6B, a binary "0" is encoded by respectively shifting transitions 64 and 65, and transitions 66 and 67, of servo track 50, towards one another. Referring to FIG. 7, the encoded information is arranged in "LPOS words" 70, each comprising a synchronization mark 71, longitudinal position information 72, and, in one embodiment, one symbol of the manufacturer data 73. A sequence of these manufacturer's data symbols may form a Manufacturer's Word. For example, as specified in the ECMA document, the Manufacturer's Word in LTO is formed by a sequence of 97 symbols, one of which is essentially a synchronization signal. Thus, 97 longitudinal positions, or LPOS's, may need to be read before a complete Manufacturer's Word is available. The longitudinal position information 72 of the sequence of LPOS words comprise a sequence of longitudinal position identifiers, such that the longitudinal position of the tape can be determined.

Typically, the sequence of longitudinal position identifiers is not limited to the length of the media in a single cartridge. Rather, the sequence continues for the entire length of a tape "pancake". A tape pancake is a single tape width output of a tape slitter, which slits a large roll (or "jumbo") of magnetic coated material into a number of tapes. The pancake is one tape in width, and is the length of the full roll. A typical pancake will have enough tape to fill many cartridge reels.

The servo tracks, including the longitudinal position (or "LPOS") information, are prerecorded onto the tape media after it is slit at the tape slitter, typically before or as it is wound into cartridge reels. The LPOS information is typically encoded into all of the parallel servo tracks of the tape, because they are typically all written, or mastered, at once. Here, all that is required is that at least one of the servo tracks comprises decodeable longitudinal position information.

The longitudinal position information 72 is typically reset at the start of each pancake, but is not reset for the start of each cartridge filled by a given pancake. Further, the length of the LPOS words are typically long enough to guarantee that the maximum number which can be represented is not reached within a pancake. In combination, this produces the property that each cartridge filled from a given pancake has an unique LPOS range which increases monotonically across the cartridge. Thus, cartridges from the same pancake are differentiated by different ranges of longitudinal positions of the tape that are wound on the cartridge reel. However, the LPOS information alone does not identify a particular media.

In accordance with the present invention, a prerecorded media identifier is provided on the media, which differentiates the cartridges. In one embodiment, a manufacturer tape pancake identifier is provided as part of the manufacturer data 73, in that each pancake is differentiated with the identifier. As one example, each slitter is given an identifier and each roll is given a separate identifier. Thus, a pancake identifier is a concatenation of the roll and slitter identifiers. Further, the roll identifiers are incremented to a high value before repeating, so that a large time threshold, such as many years, exists between roll identifiers having the same value, if ever.

Thus, in accordance with the present invention, each cartridge is differentiated from others by its prerecorded media identifier which comprises the concatenation of the manufacturer tape pancake identifier, e.g., in manufacturer data 73, and at least one of the longitudinal position identifiers 72, also called a "landmark", both encoded into the prerecorded servo track or tracks 50–54.

Before initialization of the cartridge memory, the control system 24 of FIG. 2 causes the read/write system 18–20 to read the prerecorded media identifier 72, 73 from the rewritable media; and causes the memory interface 17 to write a write-once flag and the media identifier to the cartridge memory 14 in the lockable section 30–36 of FIG. 3. Then, the control system causes the memory interface to lock the lockable read-only section of the cartridge memory to read-only, and causes the read/write system to write a write-once flag to the required data set of the rewritable media.

Thus, the write-once flags and the media identifier are provided both at the locked read-only section of the cartridge memory, and at the data storage cartridge rewritable media, in an example, respectively at the required data set and at the prerecorded servo track. As the result, tamper resistant write once recording is provided. Specifically, any attempt to rewrite the data would be prevented since the write-once flags are at both locations, and any attempt to change a cartridge memory, or to move the magnetic tape to another cartridge would be identified since the media identifier would not be the same at both the cartridge memory and the media. Further, any attempt to reinitialize the cartridge, e.g., to change the cartridge memory, would be prevented. Further, it is possible to prevent the sequence of reading the tape, bulk erasing the tape, and rewriting modified data on the same tape (e.g., since the servo information with the media identifier would be lost in the bulk erase).

Optionally, the media identifier may also be copied into the FID to serve as a warning.

The greater the number of concatenated elements, the greater the protection. Thus, the concatenation of the cartridge memory serial number, and media identifier comprising the pancake identifier and LPOS "landmark" are available for protection. The pancake identifier is itself a concatenation of the jumbo identifier and slitter position.

As is known to those of skill in the art, alternative servo arrangements may result in the use of alternative media identifiers compatible with the particular prerecorded media.

Figure 8:
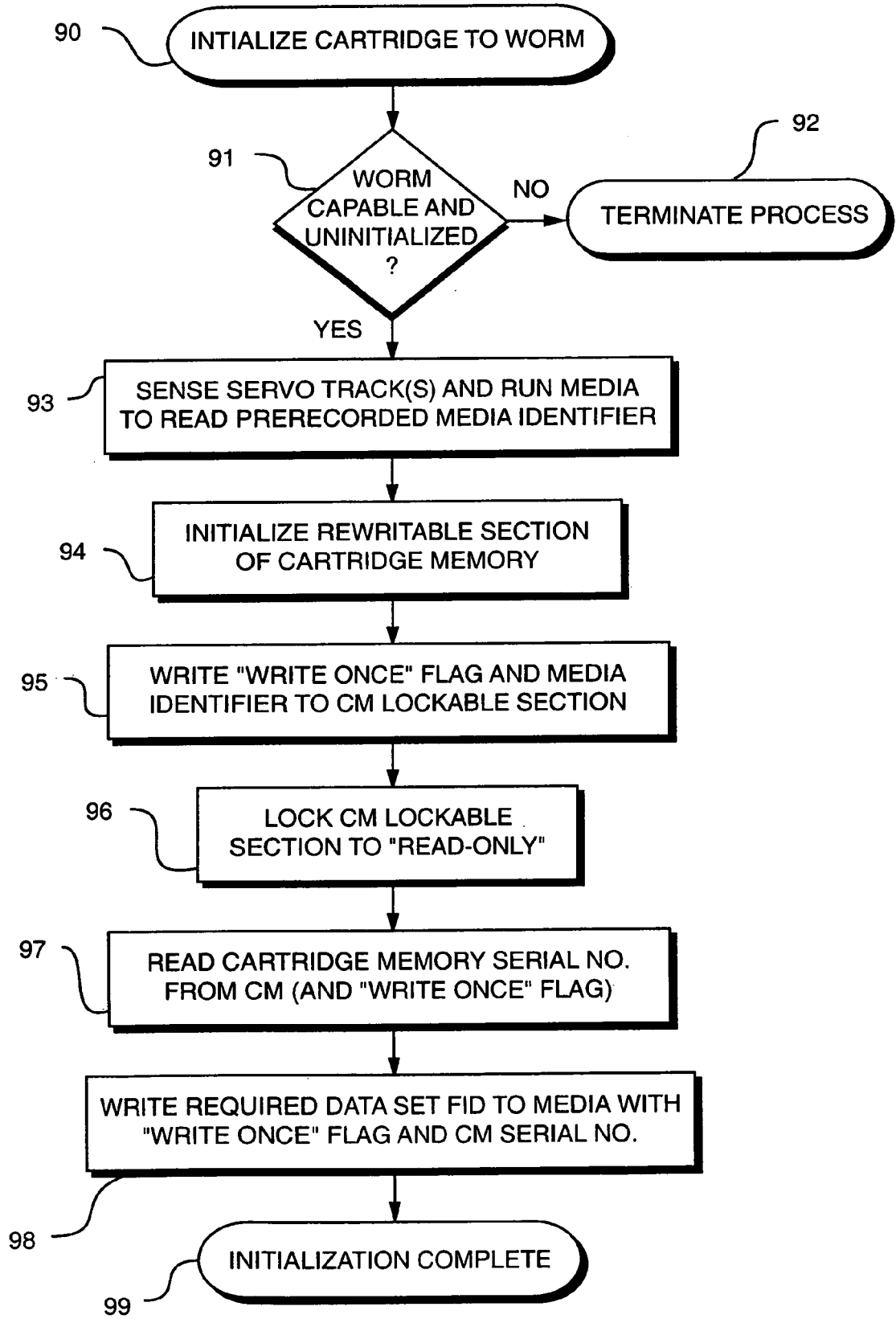
FIG. 8 is a flow chart depicting an embodiment of the method of the present invention for initializing a data storage cartridge of FIG. 1 as a WORM cartridge, employing the cartridge handling system of FIG. 2.

FIG. 8 illustrates an embodiment of a method in accordance with the present invention for initializing a cartridge to write once, read many, beginning at step 90. In step 91, the control system 24 of FIG. 2 determines whether the cartridge is WORM capable and is uninitialized. As an example, a cartridge may already be initialized in another form which retains the rewritable capability, and therefore does not match either determination. If the cartridge is not WORM capable or is not uninitialized, step 91 leads to step 92 at which the process is terminated for that cartridge.

If the cartridge is WORM capable and is uninitialized, the process continues at step 93. In step 93, the media identifier, e.g., of the data storage media 11 of FIG. 1, is read, e.g., by the read/write system 18–20 of FIG. 2. In the above example, the prerecorded servo track or tracks 50–54 of FIG. 5 are detected and the manufacturer data 73, and at least one of the longitudinal position identifiers 72 of the servo tracks of FIG. 7 are read to provide the media identifier to the control system 24.

In step 94, the restricted write and rewritable sections of the cartridge memory 14 of FIG. 3 are initialized.

In step 95, the control system 24 of FIG. 2 causes the memory interface 17 to write a write-once flag and the media identifier to the lockable section of the cartridge memory 14. As an example, the write-once flag may be written to a protected page of area 35 of the cartridge memory as shown in FIG. 3. At this point the media identifier is located at both the tape media and at the cartridge memory, and the write-once flag is only at the cartridge memory. The cartridge memory serial number is also at the cartridge memory, for example, at the CM manufacturer's information area 30.

In step 96, the control system 24 of FIG. 2 causes the memory interface 17 to lock the lockable section of the cartridge memory to read-only, for example, comprising the areas having the write-once flag, the cartridge memory serial number, the media identifier, and the write inhibit code.

In step 97, the control system 24 of FIG. 2 causes the memory interface 17 to read the cartridge memory serial number from the cartridge memory, if provided. Additionally, as one alternative, the write-once flag is also read from area 35 of the cartridge memory. As a second alternative, the control system provides the same, or different, write-once flag as provided in step 95, the flag to be employed in step 98. In step 98, the control system causes the read/write system 18–20 to further initialize the media 11 by writing the required data set to the rewritable media, including writing at least the write-once flag and the cartridge memory serial number to the required data set, for example, the FID 40 of FIGS. 4A and 4B. Optionally, the media identifier may be written to the FID 40 at this time.

Steps 93–98 may be conducted in any order, and/or portions thereof may be intermingled. As one example, step 93 is conducted first to determine "landmarks" on the physical tape media, and to read the prerecorded media identifier. Then, the FID is written containing any "write once" flag, the cartridge memory serial number (step 98) read from the cartridge memory (step 97), and, optionally, some number of cartridge memory pages including the cartridge manufacturer's information page, which contains the Manufacturer's Word that is mastered into the servo pattern, and the initialization data page which contains the "landmarks", which are LPOS positions demarking longitudinal positions on the tape. Then, the lockable section of a cartridge memory can be updated with a "write once" flag and the media identifier (step 95). The only sequential requirement is that step 95 must be conducted to write the "write once" flag and the media identifier, if any, to the cartridge memory, before locking the lockable section of the cartridge memory in step 96. Of course, any item to be written must first be provided or accessed and read, as is known to those of skill in the art. Step 94 is conducted to initialize the read/write part of the cartridge memory, and this step may be last so long as none of it will be write protected, it must of course be written before being write protected.

Thus, at this point the media identifier, the write-once flags and the cartridge memory serial number are located at both the tape media and at the cartridge memory.

Further, the cartridge memory is protected by being locked to read-only, the media identifier is protected at the media by being prerecorded and not overwritable by a normal drive, and the write-once flag and cartridge memory serial number are protected at the media by being part of a required data set. Hence, the data storage cartridge is initialized for tamper resistant write once recording, and, at step 99, the initialization is complete.

Figure 9:
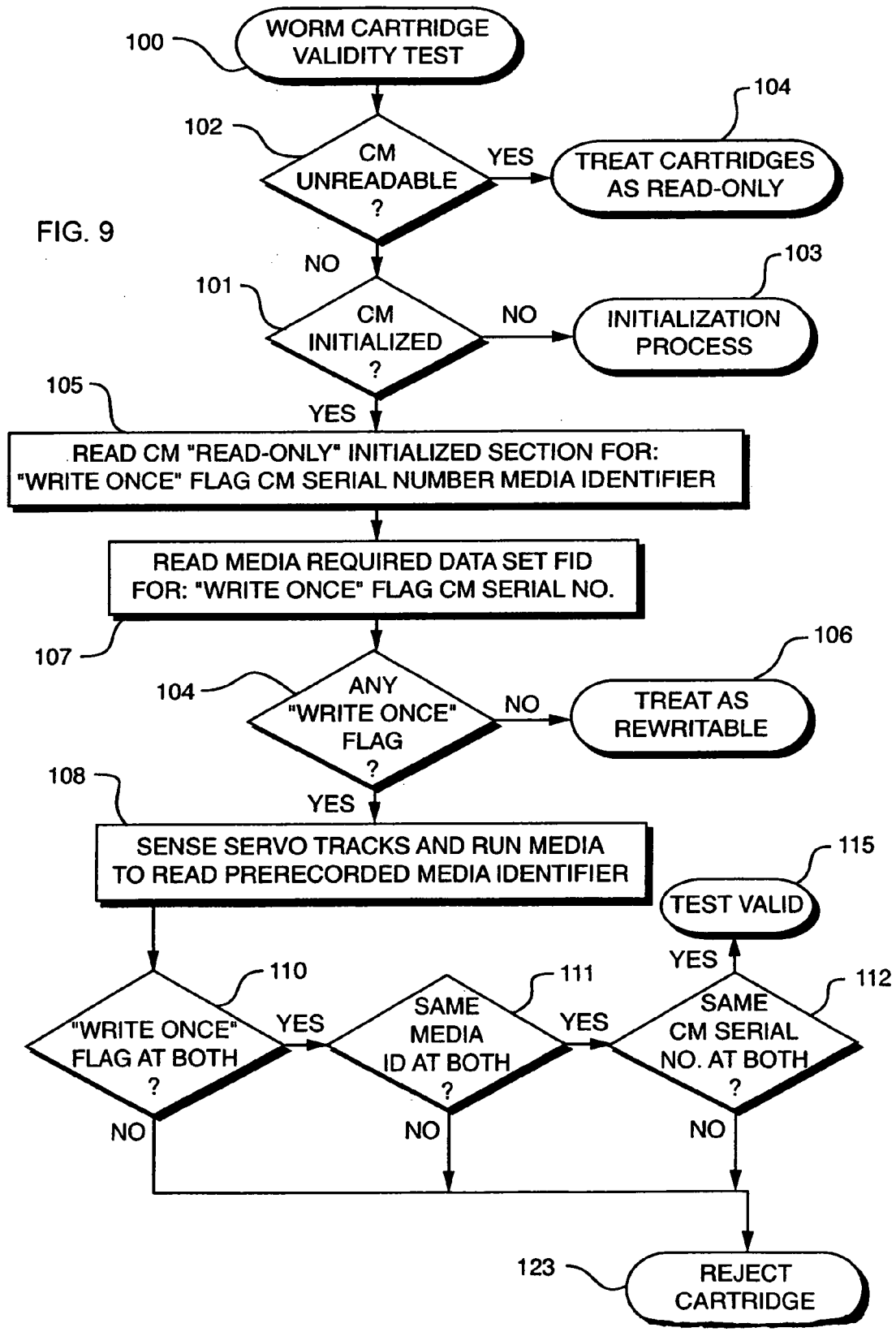
FIG. 9 is a flow chart depicting an embodiment of the method of the present invention for testing a cartridge of FIG. 1 for valid WORM initialization, employing a data storage drive, such as the cartridge handling system of FIG. 2.

FIG. 9 represents an embodiment of a method in accordance with the present invention for conducting a WORM cartridge validity test, beginning at step 100. The test is conducted by a data storage drive that is WORM capable, such as the cartridge handling system of FIG. 2. The data storage drive may differ from the cartridge handling system that initializes cartridges, by omitting the initialization microcode at the control system. In step 102, the control system 24 causes the memory interface to determine whether the cartridge memory is readable. If it is unreadable, such as if it is defective or missing, the cartridge is treated as read-only in step 104.

In step 101, the control system 24 causes the memory interface 17 to detect whether the cartridge memory 14 has been initialized. If not, the cartridge will have to be initialized to some form, such as rewritable or WORM, and the cartridge is transferred to that process at step 103. If the cartridge memory has been initialized, step 105 causes the memory interface to read at least a portion of the cartridge memory to detect the presence or absence of a write-once flag at the cartridge memory locked read-only section, e.g., area 35 of FIG. 3. Additionally, if a write-once flag is detected, and if provided in the embodiment, the memory interface reads the cartridge memory serial number and the media identifier at the cartridge memory locked read-only section, e.g., respectively areas 30 and 35.

In step 107, the control system causes the read/write system 18–20 to read at least a portion of a required data set of the media of the cartridge, for example a FID 40 of FIGS. 4A and 4B, to detect the presence or absence of a write-once flag at the rewritable media. Additionally, if provided in the embodiment, the read/write system reads the required data set for the cartridge memory serial number.

Step 104 detects the absence of any write-once flag of both the cartridge memory and the cartridge media, which indicates that the cartridge is rewritable, and, in step 106, the cartridge is treated as a rewritable cartridge.

If a write-once flag was detected either in step 105, or step 107, or both, the cartridge is likely to be write once. If provided for in the embodiment, the read/write servo system, in step 108, reads the prerecorded media identifier, for example, by sensing the servo tracks 50–54 of FIG. 5 and reads the prerecorded media identifier comprising the pancake identifier in the manufacturer data 73 of FIG. 7, and at least one of the longitudinal position identifiers 72. Step 108 may have been accomplished prior to, or as a part of, step 107.

Thus, at this point, the control system has been provided the write-once flag, if any; any cartridge memory serial number; and any media identifier; of both the cartridge memory 14 and the cartridge media 11.

In step 110, the control system 24 determines whether write-once flags were detected as provided both at the locked read-only section of the cartridge memory 14 retained in the cartridge shell, and at the required data set of the data storage cartridge rewritable media 11. If so, and if provided in the embodiment, in step 111, the control system determines whether the same media identifier was detected at both the cartridge memory 14 and the cartridge media 11. If so, and if provided in the embodiment, in step 112, the control system determines whether the same cartridge memory serial number was detected at both the cartridge memory 14 and the cartridge media 11.

Upon meeting the tests provided for in the embodiment, the control system 24 indicates that the test is valid in step 115, and operates the read/write system to read information from the rewritable media and/or to write information to previously non-written portions of the rewritable media, as is known to those of skill in the art for writing information on WORM media.

Else, that is if any of the tests provided for in the embodiment are not met, the control system, in step 123 rejects the data storage cartridge. Step 123 comprises a determination that the cartridge has likely been initialized to a write once state, but that there is no assurance that the data is valid and that the cartridge has not been tampered with.

As described above, the controller 24 directs the memory circuit interface 17 to perform memory access operations on the memory circuit 14 (e.g., contactless hardware memory circuitry). Similarly, the controller 24 directs the read/write system to perform memory access operations on the recording medium 11. That is, the controller 24 operates the read/write and servo head 18 and the read/write and servo control 19 as a recording medium interface to exchange information with the recording medium 11 (e.g., magnetic tape). As a result, the components of the cartridge handling system 15 are well-suited for providing write-once flags and a cartridge identifier (e.g., the cartridge memory serial number) at multiple locations within the data storage cartridge 10 for tamper resistant write-once recording.

Those of skill in the art understand that the steps of the above methods may be altered in sequence and, based on the embodiment, may be deleted, or equivalent steps substituted. For example, in one configuration, step 108 precedes step 104. In this configuration, the data storage cartridge 10 is not treated as R/W unless the servo manufacturer's information indicates this as well.

Additionally, those of skill in the art understand that the cartridge handling system may differ in specifics from that illustrated, and the data storage drive may differ in specifics from the cartridge handling system that initializes the cartridge, or alternatively may be identical, and comprise microcode at the control system for initializing cartridges. In one configuration, a computer program product having a computer readable medium (e.g., a set of diskettes, tapes or CD-ROMs) provides instructions that, when carried out by the controller 24 (e.g., a computerized circuit), directs initialization of a data storage cartridge 10 for tamper resistant write-once recording.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A cartridge handling system for initializing a data storage cartridge for tamper resistant write-once recording, the data storage cartridge having (i) a memory circuit, (ii) a recording medium, and (iii) a cartridge shell which contains the memory circuit and the recording medium, the cartridge handling system comprising:

a memory circuit interface to exchange information with the memory circuit of the data storage cartridge;

a recording medium interface to exchange information with the recording medium of the data storage cartridge; and a controller coupled to the memory circuit interface and the recording medium interface, the controller being configured to:

direct the memory circuit interface to write a memory circuit write-once flag to a section of the memory circuit, direct the memory circuit interface to read a cartridge identifier from the memory circuit, and direct the recording medium interface to write a recording medium write-once flag and the cartridge identifier to the recording medium to provide write-once flags and the cartridge identifier at multiple locations within the cartridge shell for tamper resistant write-once recording.

2. The cartridge handling system of claim 1 wherein the recording medium of the data storage cartridge stores a Format Identification Data Set, and wherein the recording medium interface is configured to write the recording medium write-once flag and the cartridge identifier to respective locations within the Format Identification Data Set when the controller directs the recording medium interface to write the recording medium write-once flag and the cartridge identifier to the recording medium.

3. The cartridge handling system of claim 1 wherein the controller is further configured to:

direct the recording medium interface to read a prerecorded media identifier from the recording medium; and direct the memory circuit interface to write the prerecorded media identifier to the section of the memory circuit.

4. The cartridge handling system of claim 1 wherein the controller is further configured to:

lock the section of the memory circuit to a read-only state.

5. The cartridge handling system of claim 1 wherein the memory circuit interface is configured to communicate with contactless hardware memory circuitry of the memory circuit, and wherein the recording medium interface is configured to communicate with magnetic tape memory of the recording medium.

6. The cartridge handling system of claim 2 wherein the controller is configured to identify tampering and prevent data rewriting when the cartridge identifier from the memory circuit is not the same as the cartridge identifier written to the respective locations within the Format Identification Data Set stored by the recording medium.

7. A data storage cartridge, comprising:

a memory circuit having a section that stores a cartridge identifier and a memory circuit write-once flag;

a recording medium that stores the cartridge identifier and a recording medium write-once flag; and a cartridge shell which contains the memory circuit and the recording medium to provide write-once flags and the cartridge identifier at multiple locations within the cartridge shell for tamper resistant write once recording.

8. The data storage cartridge of claim 7 wherein the recording medium stores a Format Identification Data Set which includes the recording medium write-once flag and the cartridge identifier.

9. The data storage cartridge of claim 7 wherein the recording medium further stores a prerecorded media identifier which is prerecorded on the recording medium, and wherein the section of the memory circuit further stores the prerecorded media identifier.

10. The data storage cartridge of claim 7 wherein the section of the memory circuit is locked to a read-only state.

11. The data storage cartridge of claim 7 wherein the memory circuit includes contactless hardware memory circuitry that stores the cartridge identifier and the memory circuit write-once flag; and wherein the recording medium includes magnetic tape memory that stores the cartridge identifier and the recording medium write-once flag.

12. The data storage cartridge of claim 8 wherein a difference between (i) the cartridge identifier stored by the section of the memory circuit and (ii) the cartridge identifier of the Format Identification Data Set stored by the recording medium identifies tampering and prevents data rewriting.

13. A method for initializing a data storage cartridge for tamper resistant write-once recording, the data storage cartridge having (i) a memory circuit, (ii) a recording medium, and (iii) a cartridge shell which contains the memory circuit and the recording medium, the method comprising:
writing a memory circuit write-once flag to a section of the memory circuit;
reading a cartridge identifier from the memory circuit; and
writing a recording medium write-once flag and the cartridge identifier to the recording medium to provide write-once flags and the cartridge identifier at multiple locations within the cartridge shell for tamper resistant write-once recording.

14. The method of claim 13 wherein the recording medium of the data storage cartridge stores a Format Identification Data Set, and wherein writing the recording medium write-once flag and the cartridge identifier to the recording medium includes:
storing the recording medium write-once flag and the cartridge identifier to respective locations within the Format Identification Data Set.

15. The method of claim 13, further comprising:
reading a prerecorded media identifier from the recording medium; and
writing the prerecorded media identifier to the section of the memory circuit.

16. The method of claim 13, further comprising:
after writing the memory circuit write-once flag to the section of the memory circuit, locking the section of the memory circuit to a read-only state.

17. The method of claim 13 wherein reading the cartridge identifier includes obtaining the cartridge identifier from contactless hardware memory circuitry of the memory circuit; and wherein writing the recording medium write-once flag and the cartridge identifier to the recording medium includes storing the recording medium write-once flag and the cartridge identifier on magnetic tape memory of the recording medium.

18. The method of claim 14, further comprising:
identifying tampering and prevent data rewriting when the cartridge identifier from the memory circuit is not the same as the cartridge identifier written to the respective locations within the Format Identification Data Set stored by the recording medium.

19. A data storage drive for exchanging information with a data storage cartridge having (i) a memory circuit, (ii) a recording medium, and (iii) a cartridge shell which contains the memory circuit and the recording medium, the data storage drive comprising:
a memory circuit interface to interface with the memory circuit of the data storage cartridge;
a recording medium interface to interface with the recording medium of the data storage cartridge; and
a controller coupled to the memory circuit interface and the recording medium interface, the controller being configured to:
direct the memory circuit interface to read a section of the memory circuit,
direct the recording medium interface to read a portion of the recording medium,
enable normal information exchange with the data storage cartridge when the section of the memory circuit includes a memory circuit write-once flag and a cartridge identifier and when the portion of the recording medium includes a recording medium write-once flag and the cartridge identifier, and
reject normal information exchange with the data storage cartridge when at least one of (i) the section of the memory circuit does not include both the memory circuit write-once flag and the cartridge identifier, and (ii) the portion of the recording medium does not include both the recording medium write-once flag and the cartridge identifier.

20. The data storage drive of claim 19 wherein the recording medium of the data storage cartridge stores a Format Identification Data Set, and wherein the recording medium interface is configured to access at least a portion of the Format Identification Data Set when the controller directs the recording medium interface to read the portion of the recording medium.

21. The data storage drive of claim 19 wherein the controller is further configured to selectively read information from the recording medium and write information to previously non-written portions of the recording medium when the controller enables normal information exchange with the data storage cartridge.

22. The data storage drive of claim 19 wherein the controller, when enabling normal information exchange with the data storage cartridge, is configured to confirm that the memory circuit further includes a prerecorded media identifier and that the portion of the recording medium further includes the prerecorded media identifier; and wherein the controller, when rejecting normal information exchange with the data storage cartridge, is configured to confirm at least one of (i) that the memory circuit does not include the prerecorded media identifier and (ii) that the portion of the recording medium does not include the prerecorded media identifier.

23. The data storage drive of claim 19 wherein the memory circuit interface is configured to communicate with contactless hardware memory circuitry of the memory circuit, and wherein the recording medium interface is configured to communicate with magnetic tape memory of the recording medium.

24. The data storage drive of claim 20 wherein the controller, when rejecting normal information exchange, is configured to identify tampering and prevent data rewriting in response to a detected difference between (i) the cartridge identifier of the section of the memory circuit and (ii) a cartridge identifier of the Format Identification Data Set stored by the recording medium.

25. A computer program product that includes a computer readable medium having instructions stored thereon for initializing a data storage cartridge for tamper resistant write-once recording, such that the instructions, when carried out by a computerized circuit, cause the computerized circuit to:
  direct a memory circuit interface to write a memory circuit write-once flag to a section of a memory circuit of a data storage cartridge,
  direct the memory circuit interface to read a cartridge identifier from the memory circuit of the data storage cartridge, and
  direct a recording medium interface to write a recording medium write-once flag and the cartridge identifier to a recording medium of the data storage cartridge to provide write-once flags and the cartridge identifier at multiple locations within the data storage cartridge for tamper resistant write-once recording.

26. The computer program product of claim 25 wherein the recording medium of the data storage cartridge stores a Format Identification Data Set, and wherein the instructions of the computer readable medium cause the computerized circuit to direct the recording medium interface to write the recording medium write-once flag and the cartridge identifier to respective locations within the Format Identification Data Set when writing the recording medium write-once flag and the cartridge identifier to the recording medium.

27. The computer program product of claim 26 wherein the instructions, when carried out by the computerized circuit, further cause the computerized circuit to identify tampering and prevent data rewriting when the cartridge identifier from the memory circuit is not the same as the cartridge identifier written to the respective locations within the Format Identification Data Set stored by the recording medium.

* * * * *